United States Patent [19]

Itoh

[11] Patent Number: 5,050,225
[45] Date of Patent: Sep. 17, 1991

[54] IMAGE PROCESSING APPARATUS AND METHOD

[75] Inventor: Masaharu Itoh, Yamato, Japan

[73] Assignee: International Business Machines Corporation, Armonk, N.Y.

[21] Appl. No.: 515,372

[22] Filed: Apr. 27, 1990

[30] Foreign Application Priority Data

Apr. 28, 1989 [JP] Japan .................................. 1-07295

[51] Int. Cl.⁵ .............................................. G06K 9/36
[52] U.S. Cl. ...................................... 382/46; 340/727; 358/448
[58] Field of Search ..................... 382/44, 46; 364/521, 364/518, 731; 340/727, 731; 358/448, 451, 180

[56] References Cited

U.S. PATENT DOCUMENTS

| | | | |
|---|---|---|---|
| 4,611,232 | 9/1986 | Searby | 382/46 |
| 4,612,540 | 9/1986 | Pratt | 340/793 |
| 4,618,991 | 10/1986 | Tabata et al. | 382/46 |
| 4,637,057 | 1/1987 | Kermisch | 382/46 |
| 4,759,076 | 7/1988 | Tanaka et al. | 382/46 |

Primary Examiner—Leo H. Boudreau
Attorney, Agent, or Firm—Thomas P. Dowd

[57] ABSTRACT

An image processing apparatus and method is disclosed for rapidly rotating images through selected angles by first generating each pel row of a scaled version of an original image in response to scaling values determined by the rotation angle selected; then performing horizontal shear and vertical shear operations, in response to values of horizontal and vertical shears determined by the selected rotation angle, and generating addresses in an output image memory into which the first pels of the pel rows of the scaled image are to be stored; in response to the value of vertical shear and the address of the first pel of each respective row, generating respective lines of addresses in the output memory into which all the remaining pels of each respective pel row of the scaled image are to be stored; and finally storing all the pels of the pel rows in the generated addresses of the output image memory. Also the lines are generated using a vertical shear control value such that the addresses of all the pels of a pel row in the output image memory are stored with vertical alignment of address transitions of the horizontally adjacent pels in all the pel rows in the rotated image.

12 Claims, 7 Drawing Sheets

IMAGE PROCESSING APPARATUS AND METHOD

BACKGROUND OF THE INVENTION

1. Technical field

The invention relates to an image processing apparatus and method for rotating an original image formed of picture elements arranged in rows and columns, and more particularly, to an apparatus and method wherein combined horizontal shear and vertical shear operations are performed to generate addresses in an output image memory into which the first pels of each pel row are stored, and following which the addresses for all the other pels of each pel row in the memory are generated by a line generator.

2. Prior art and problems

In the prior art Affine transformation has been used to rotate an original image including picture elements arranged in rows aligned with an X axis and columns aligned with a Y axis.

The Affine transformation in a two-dimensional plane is represented as follows:

$$x' = ax + by + tx \quad (1)$$

$$y' = cx + dy + ty \quad (2)$$

where x and y are the coordinates before translation. The Affine transformation may be broken down into a linear transformation and a translation, as follows:

$$\begin{bmatrix} a & b & tx \\ c & d & ty \\ 0 & 0 & 1 \end{bmatrix} = \begin{bmatrix} a & b & 0 \\ c & d & 0 \\ 0 & 0 & 1 \end{bmatrix} \begin{bmatrix} 1 & 0 & tx \\ 0 & 1 & ty \\ 0 & 1 & 1 \end{bmatrix} \quad (3)$$

Affine transformation = Linear transformation · Translation

The translation represents a shift amount in the X and Y directions and could be eliminated in the image rotation. The Affine transformation for the image rotation is expressed as follows:

$$\begin{pmatrix} x' \\ y' \end{pmatrix} = \begin{pmatrix} a & b \\ c & d \end{pmatrix} \begin{pmatrix} x \\ y \end{pmatrix} \quad (4)$$

A picture element (pel) at a coordinate address (x, y) is moved to a coordinate address (x', y'). The linear transformation is decomposable into two shears and two scale transformation matrices as illustrated in equations (5.1)–(5.6), as follows:

$$\begin{bmatrix} a & b \\ c & d \end{bmatrix} = \begin{bmatrix} 1 & 0 \\ c/a & 1 \end{bmatrix} \begin{bmatrix} 1 & 0 \\ 0 & D/a \end{bmatrix} \begin{bmatrix} a & 0 \\ 0 & 1 \end{bmatrix} \begin{bmatrix} 1 & b/a \\ 0 & 1 \end{bmatrix} \quad 5.1$$

$$= \begin{bmatrix} 1 & b/d \\ 0 & 1 \end{bmatrix} \begin{bmatrix} 1 & 0 \\ 0 & d \end{bmatrix} \begin{bmatrix} D/d & 0 \\ 0 & 1 \end{bmatrix} \begin{bmatrix} 1 & 0 \\ c/d & 1 \end{bmatrix} \quad 5.2$$

$$= \begin{bmatrix} 1 & 0 \\ c/a & 1 \end{bmatrix} \begin{bmatrix} 1 & ab/D \\ 0 & 1 \end{bmatrix} \begin{bmatrix} 1 & 0 \\ 0 & D/a \end{bmatrix} \begin{bmatrix} a & 0 \\ 0 & 1 \end{bmatrix} \quad 5.3$$

$$= \begin{bmatrix} 1 & b/d \\ 0 & 1 \end{bmatrix} \begin{bmatrix} 1 & 0 \\ cd/D & 1 \end{bmatrix} \begin{bmatrix} 1 & 0 \\ 0 & d \end{bmatrix} \begin{bmatrix} D/d & 0 \\ 0 & 1 \end{bmatrix} \quad 5.4$$

$$= \begin{bmatrix} 1 & 0 \\ 0 & D/a \end{bmatrix} \begin{bmatrix} a & 0 \\ 0 & 1 \end{bmatrix} \begin{bmatrix} 1 & 0 \\ ac/d & 1 \end{bmatrix} \begin{bmatrix} 1 & b/a \\ 0 & 1 \end{bmatrix} \quad 5.5$$

$$= \begin{bmatrix} 1 & 0 \\ 0 & d \end{bmatrix} \begin{bmatrix} D/d & 0 \\ 0 & 1 \end{bmatrix} \begin{bmatrix} 1 & vd/D \\ 0 & 1 \end{bmatrix} \begin{bmatrix} 1 & 0 \\ c/d & 1 \end{bmatrix} \quad 5.6$$

where D = (ad − bc)

Two approaches using the equation (5.3) to perform the Affine transformation have been used to rotate the original image.

The first prior art approach is illustrated in FIG. 4. An original image 41 is stored in an image memory. In the first step, the original image is scaled in both the X and Y direction. That is, the number of pels in the image in the X direction is reduced and the number of pels in the Y direction is increased, but the total number of pels of the original image 41 is equal to the total number of pels in the ultimate rotated image 44. The term "scale" thus means that while the dimensions of the image may change there is no increase or reduction in the number of pels making up the image. The scaled image 42 is temporarily stored in a first intermediate memory space. The third and fourth matrices in the equation (5.3) correspond to the scaling operations. In the second step, all pels of the scaled image 42 are sequentially read out, and the scaled image 42 is horizontally sheared. The second matrix in the equation (5.3) corresponds to the horizontal shear operation. In the horizontal shear operation, the vertical columns of the scaled image 42 are inclined with respect to their original alignment with the Y axis, while the horizontal rows are maintained in alignment with the X direction. In other words, the addresses of the pels of the scaled image 42 are horizontally shifted. The horizontally sheared image 43 is temporarily stored in a second intermediate memory space. In the third step, all pels of the horizontally sheared image 43 are sequentially read out, and the image 43 is vertically sheared. The first matrix in equation (5.3) corresponds to the vertical shear operation. In the vertical shear operation, the horizontal rows of the image 43 are inclined with respect to the X axis. In other words, the addresses of all the pels of the image 43 are vertically shifted. The resulting rotated image 44 is stored in an output memory. The horizontal shift and vertical shift operations are known in the art as "transvection", but are called the horizontal shear and the vertical shear in this specification. It will be seen that the above-described rotating operations require two store operations into first and second intermediate memory spaces, and the calculation of the addresses of all the pels of the image to perform both the horizontal and vertical shear operations, all of which requires a relatively long time period. Consequently, an operator must wait a long time, after the rotation commands have been entered into the image processor, for a result.

IBM Technical Disclosure Bulletin, Vol. 13, No. 11, April 1971, pp. 3267–3268, discloses the use of the Affine transformation for rotating a two dimensional binary image. However, this article describes a different operational sequence from the above-described rotating operations but does also require intermediate memory spaces.

A second prior art approach is described in IBM Technical Disclosure Bulletin, Vol. 28, No. 10, March 1986, pp. 4330–4331. This article discloses the use of the equation (5.3), and the approach scales the original image in the X and Y directions in accordance with the third and fourth matrices, as well as performing the horizontal and vertical shear operations of the second and first matrices of equation (5.3). In the article, however, the addresses of all the pels of the scaled image are calculated in accordance with the second and first matrices to generate the horizontally and vertically sheared addresses, which are the addresses stored in an output memory. Consequently, the rotated version of the original image is directly stored in the output memory without requiring the intermediate memory spaces as in the first approach. Although the approach of this article reduces the processing time in comparison with the first approach, the technique of the article still requires a time period for calculating the addresses of all the pels of the scaled image.

It is clearly desirable and accordingly the object of the present invention to provide an image processing apparatus and method for rotating a two-dimensional original image at a much higher speed than possible with techniques of the prior art.

SUMMARY OF THE INVENTION

An image processing apparatus for rapidly rotating images through selected angles in accordance with the present invention includes components for performing the combination of the following steps: generating each pel row of a scaled version of an original image in response to scaling values determined by a desired or selected rotation angle; performing horizontal shear and vertical shear operations, in response to values of horizontal and vertical shears determined by the selected rotation angle, whereby addresses are generated in an output image memory into which the first pels of the pel rows of the scaled image are to be stored; in response to the value of vertical shear and the address of the first pel of each respective row, generating respective lines of addresses in the output memory into which all the remaining pels of each respective pel row of the scaled image are to be stored; and storing all the pels of the pel rows in the generated addresses of the output image memory.

More particularly, the means for generating the scaled image version includes a Y-scale unit for scaling the original image in the column direction, and an X-scale unit for scaling the original image in the row direction. The means for performing the horizontal shear and vertical shear operations includes an H-shear unit which performs the horizontal shear operation on the first pel of a pel row, and a V-shear unit which performs the vertical shear operation on the horizontally sheared first pel.

The line generating means responds to the value of vertical shear, the address of the first pel and a control value generated by the V-shear unit to generate the addresses of all the pels of a pel row in the output image memory with vertical alignment of address transitions of the horizontally adjacent pels in all the pel rows in the rotated image in the output image memory also being performed.

DETAILED DESCRIPTION OF THE PREFERRED EMBODIMENT

Figure 1:
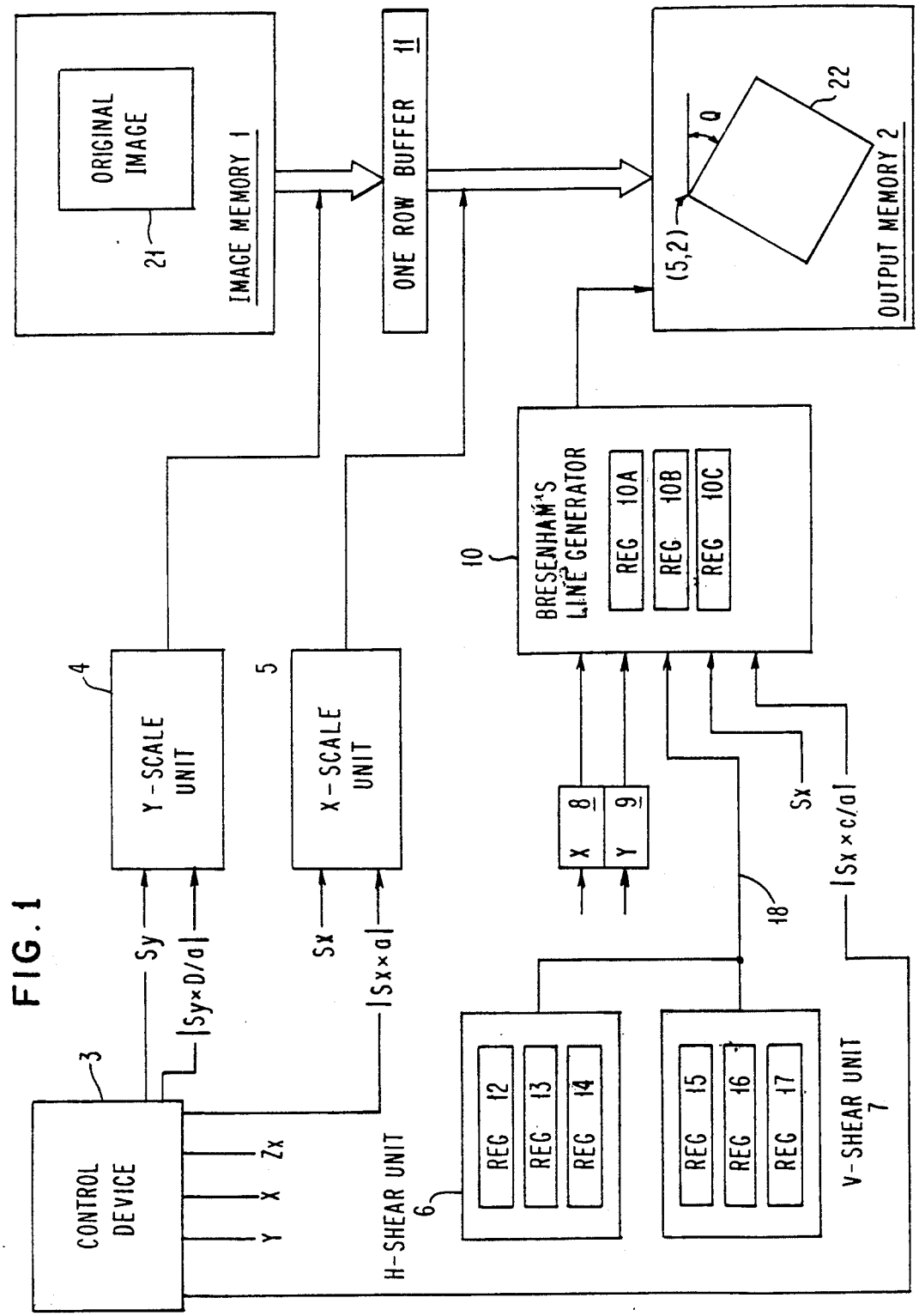
FIG. 1 is a block diagram of an image processing apparatus in accordance with the present invention.
Figure 2:
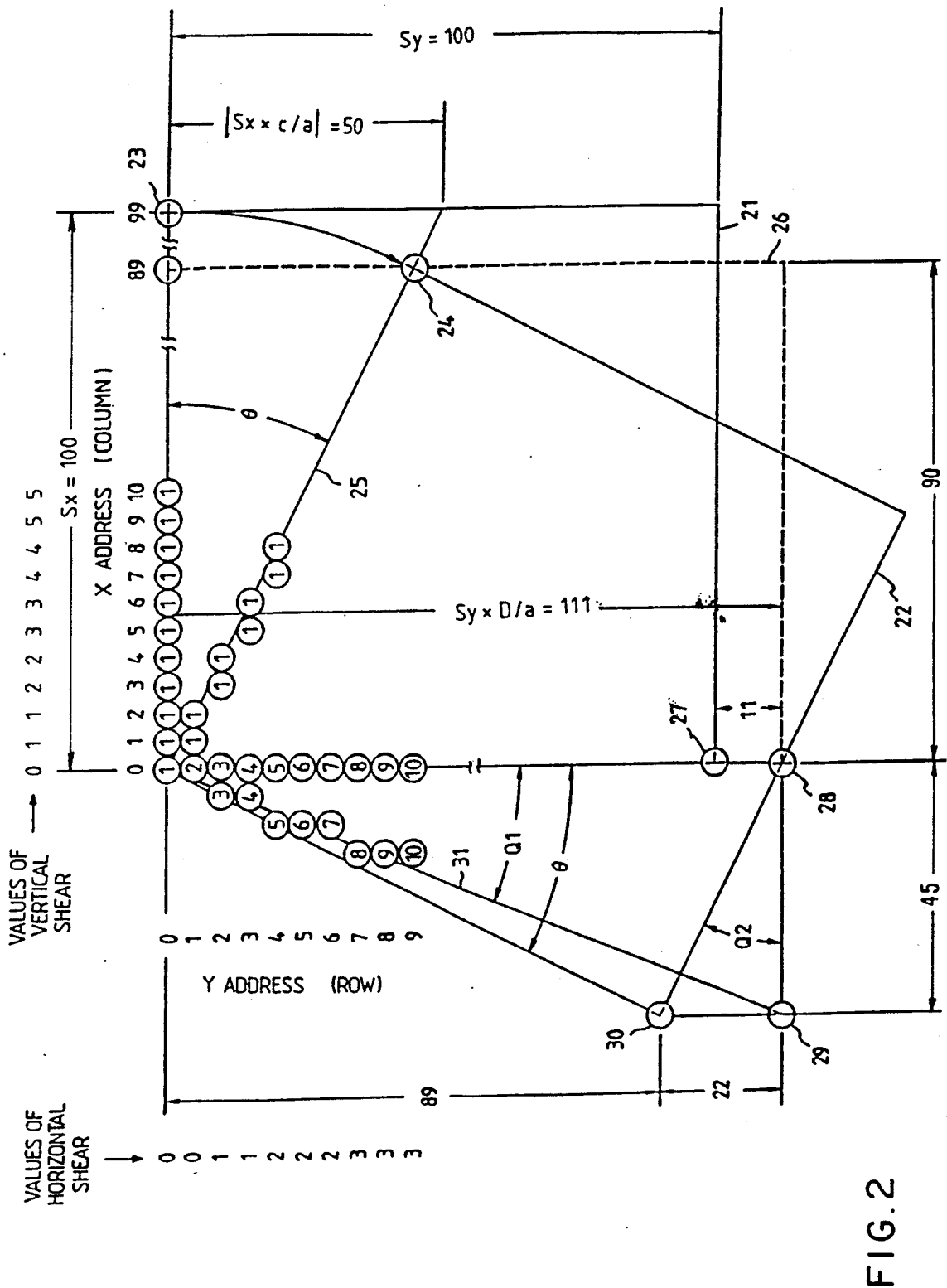
FIGS. 2 and 3 illustrate the relationship of the original image to be rotated and the rotated image.

FIG. 1 is a block diagram of an image processing apparatus of the present invention, and FIG. 2 illustrates the concept of image rotation using the Affine transformation in accordance with the present invention.

Figure 3:
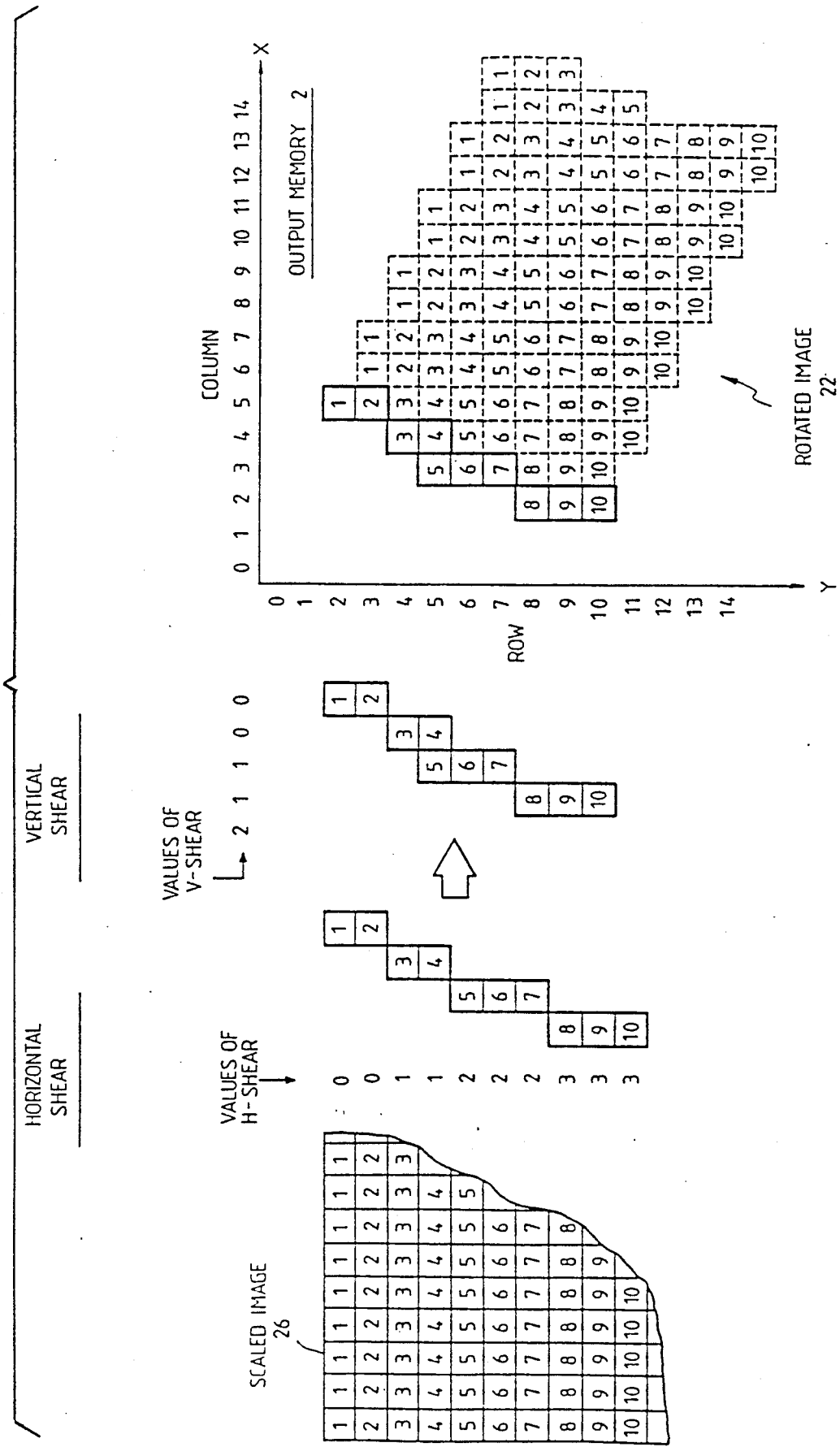
Figure 4:
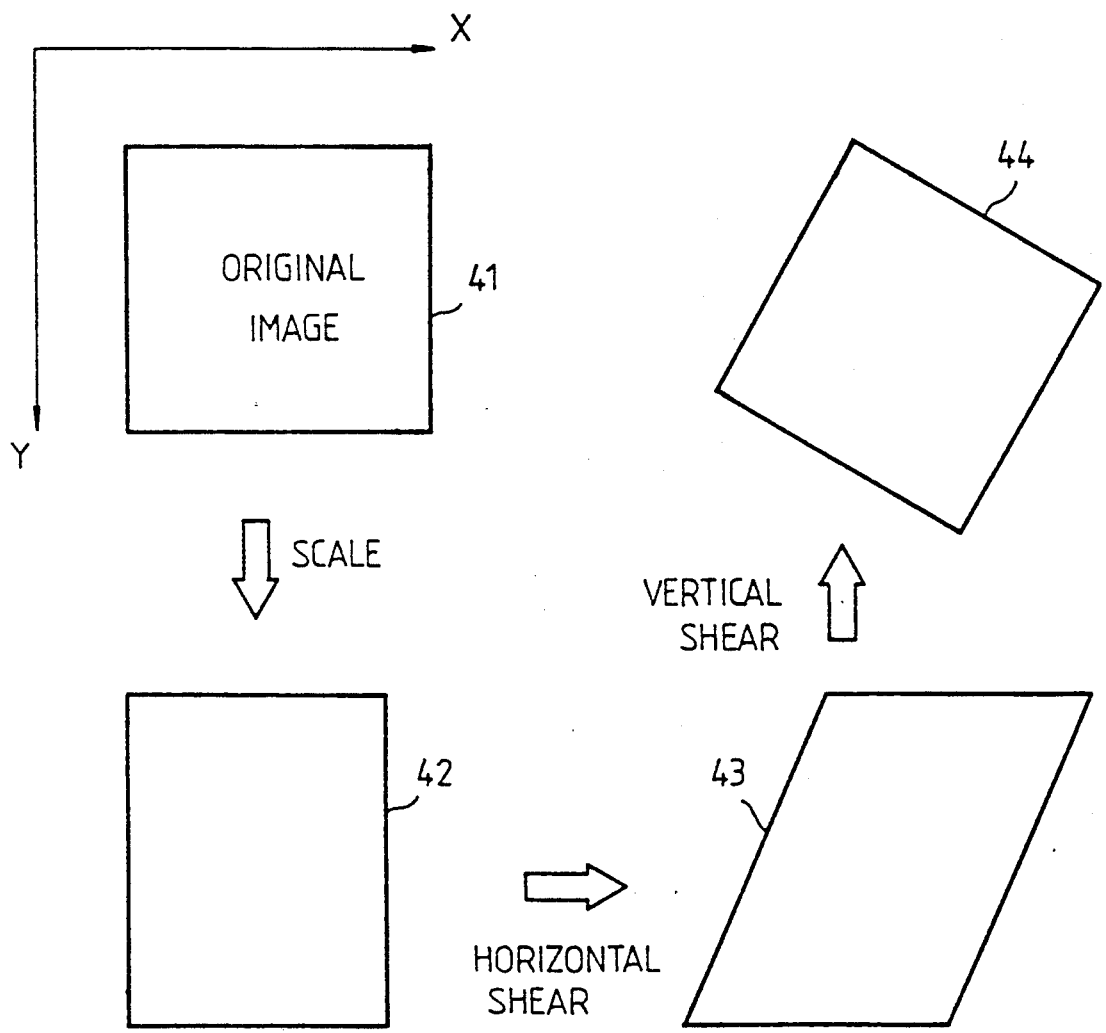
FIG. 4 illustrates a prior art image rotation technique.

As seen in FIG. 1 an original image 21 is stored in an image memory 1 and a rotated image 22 is stored in an output memory or output image memory 2. It is assumed for the purposes of the following exemplary description that the size Sx, i.e., the number of pels in the X direction of the original image 21, is 100 pels and the size Sy in the Y direction is 100 pels; the rotation angle $\theta$ is equal to 26°; and the upper-left corner pel of the rotated image 22 is stored at an address (5,2) in the output memory 2, as shown in FIGS. 2 and 3.

The invention uses the equation (5.3) described hereinbefore. That equation is as follows:

$$\begin{bmatrix} a & b \\ c & d \end{bmatrix} = \begin{bmatrix} 1 & 0 \\ c/a & 1 \end{bmatrix} \begin{bmatrix} 1 & ab/D \\ 0 & 1 \end{bmatrix} \begin{bmatrix} 1 & 0 \\ 0 & D/a \end{bmatrix} \begin{bmatrix} a & 0 \\ 0 & 1 \end{bmatrix} \quad (5.3)$$

$$= \begin{bmatrix} 1 & 0 \\ c/a & 1 \end{bmatrix} \begin{bmatrix} 1 & 0 \\ c/a & 1 \end{bmatrix} \begin{bmatrix} 1 & ab/D \\ 0 & 1 \end{bmatrix} \begin{bmatrix} a & 0 \\ 0 & D/a \end{bmatrix} \quad (6)$$

In the rotation of the image, $$\begin{pmatrix} a & b \\ c & d \end{pmatrix} = \begin{pmatrix} \cos\theta & -\sin\theta \\ \sin\theta & \cos\theta \end{pmatrix} \quad (7)$$

Since the angle $\theta = 26°$, then $$\cos \theta = 0.9 \quad (8)$$

$$\sin \theta = 0.45 \quad (9)$$

and thus, $$a = d = 0.9$$

$$b = -0.45$$

$$c = 0.45$$

$$c/a = 0.5 = \frac{1}{2}$$

$$ab/D = -0.4 = -2/5$$

A control device 3, which may be a microcomputer, generates various control signals, timing signals and control data which are applied to the appropriate blocks in FIG. 1 to control the operations of the components represented by the blocks. To simplify the drawing, all of the connection lines between the control unit 3 and the blocks are not completed in FIG. 1.

The control device 3 generates control data or parameters, as identified in the following Table 1, in an initial set-up period, as shown as block 51 in FIG. 5, and supplies them to the various units in FIG. 1, as shown in Table 1.

TABLE 1

| Values in the described example | | |
|---|---|---|
| $Sy =$ | 100 | supplied to Y-scale unit 4 |
| $\lvert Sy \times D/a \rvert =$ | $100 \times 1/0.9 \approx 111$ | supplied to Y-scale unit 4 |
| $Sx =$ | 100 | supplied to X-scale unit 5 |
| $\lvert Sx \times a \rvert =$ | $100 \times 0.9 = 90$ | supplied to X-scale unit 5 |
| $2 \times \lvert Sy \times ab/D \rvert =$ | $2 \times \lvert 100 \times (-0.4) \rvert = 80$ | set to register 12 |
| $2 \times \{\lvert Sy \times ab/D \rvert - Sy\} =$ | $2 \times \{\lvert 100 \times (-0.4) \rvert - Sy\} = 120$ | set to register 13 |
| $2 \times \lvert Sy \times ab/D \rvert - Sy =$ | $2 \times \lvert 100 \times (-0.4) \rvert - Sy = -20$ | set to register 14 |
| $2 \times \lvert Sx \times c/a \rvert =$ | $2 \times \lvert 100 \times 0.5 \rvert = 100$ | set to register 15 |
| $2 \times \{\lvert Sx \times c/a \rvert - Sx\} =$ | $2 \times \{\lvert 100 \times 0.5 \rvert - 100\} = -100$ | set to register 16 |
| $2 \times \lvert Sx \times c/a \rvert - Sx =$ | $2 \times \lvert 100 \times 0.5 \rvert - 100 = 0$ | set to register 17 |
| $Sx =$ | 100 | supplied to generator 10 |
| $\lvert Sx \times c/a \rvert =$ | 50 | supplied to generator 10 |

The value D/a is the scaling value in the Y or column direction, and the value a is the scaling value in the X or row direction. These values are determined by the rotation angle $\theta$. The value ab/D is the value of the horizontal shear, and the value c/a is the value of the vertical shear. These values are also determined by the rotation angle $\theta$.

The control device 3 also sets the address (5,2) into X and Y address registers 8 and 9 in the block 51. That is, the initial value of the X address register 8 is "5", and the initial address of the Y address register 9 is "2".

Before describing the operations, the scaling of the image will be described.

The scaling of the original image in the Affine transformation is well known in the art, e.g., see above-noted IBM Technical Disclosure Bulletin, Vol. 28, No. Mar. 10, 1986, pp. 4330-4331.

As shown in FIG. 2 the number of pels in the X direction of the scaled image 26 are reduced to 90 pels, and the number of pels in the Y direction of the scaled image 26 are increased to 111 pels. The reason for the scale down in the X direction is that when the original image 21 is rotated by angle $\theta (\theta = 26°)$, the rightmost pel 23 of the first pel row of the image 21 is moved to the position of pel 24, and since the pels on a display screen of a display device connected to output memory 2 are normally arranged in the X-Y matrix, the rotated pel row on a line 25 is displayed by 90 pels, as shown in the FIG. 2. The reason for the scale up in the Y direction is that the total number of pels of the original image 21 should be substantially equal to the total number of pels of the rotated image 22.

Referring to FIG. 1, it will be seen that as each of the rows of the original image 21 is sequentially fetched from the image memory 1 and stored in one row buffer 11, the scale up in the Y direction of the original image is performed.

The scale ratio in the Y direction is represented by the value D/a in the third matrix of the equation (6). The parameters Sy and $\lvert Sy \times D/a \rvert$ are applied to the Y-scale unit 4, as described hereinbefore. The value Sy represents the number of pels in the Y direction of the original image 21, and in the exemplary case, Sy=100. The value $\lvert Sy \times D/a \rvert$ represents the number of pels in the Y direction of the scaled image 26, that is, since the value $a = \cos \theta = 0.9$ from the equations (7) and (8), and D=1, then;

$$\lvert Sy \times D/a \rvert = 100 \times 1.11 = 111 \text{(pels)}$$

Thus, the 100-pel rows or lines of the original image 21 are scaled up or increased to 111-pel rows by the Y-scale unit 4, as shown in FIG. 2. To form the 111-pel rows, certain pel rows in the one buffer 11 are used two times. Accordingly, the Y-scale unit 4 generates either an output signal 1 which represents the fetch of the next pel row of the original image 21 into the one row buffer 11, or an output signal 0, which represents a no fetch of the next pel row of the original image 21. In the latter case the particular pel row retained in the one row buffer 11 is used again to perform a double mapping of that pel row into the output memory 2.

Figure 5:
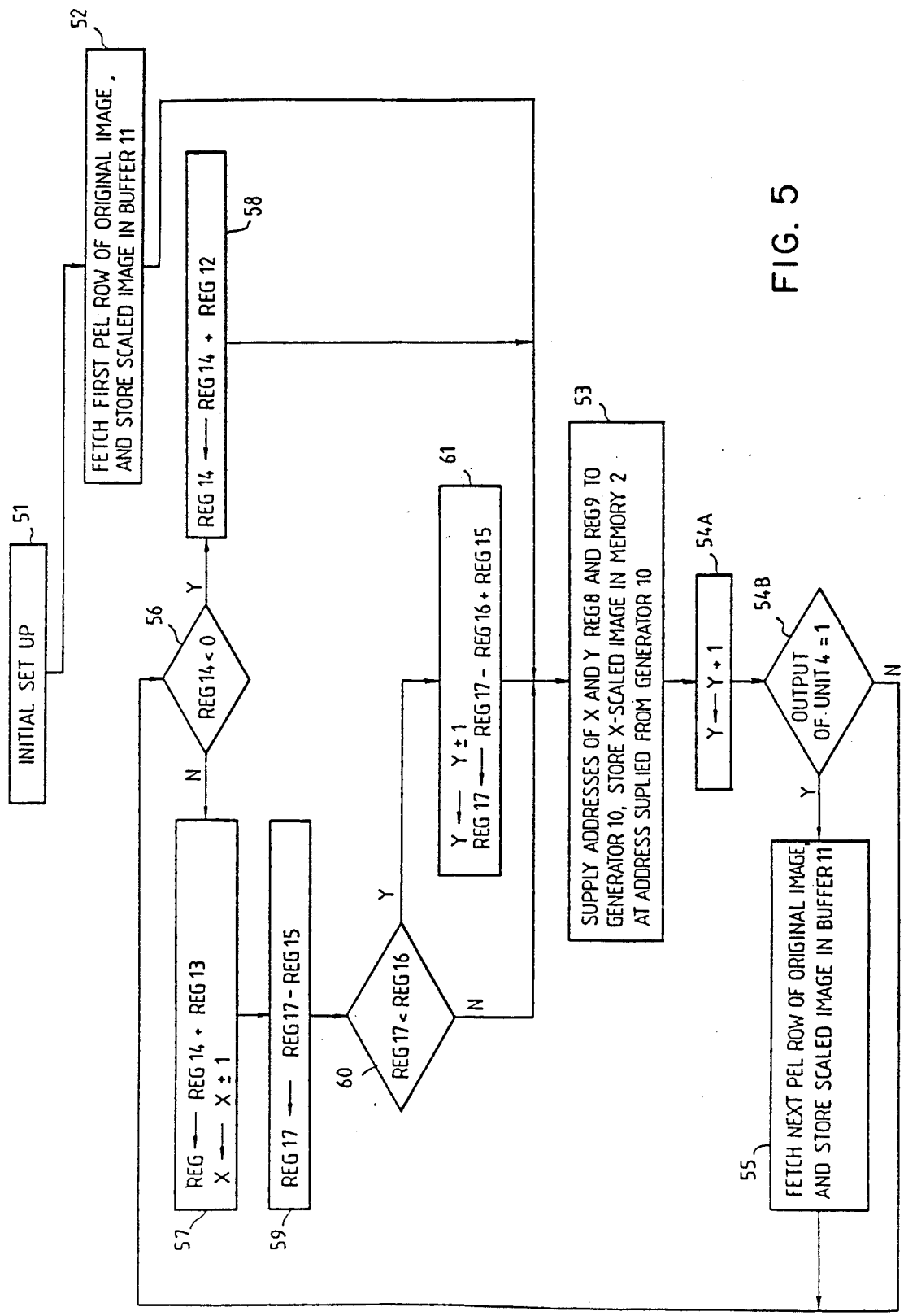
FIG. 5 is a flow chart of the algorithm in accordance with the present invention.

Describing now the operations of the apparatus or system in accordance with the invention with reference to the flow chart of FIG. 5, the scaled first pel row including the pels 1, 1, 1, 1 . . . 1 of the original image 21 in FIGS. 2 and 3, is stored in the one row buffer 11 in the block 52 of FIG. 5 under the control of the control device 3.

It should be noted that:

(a) the pels in the first pel row of the original image 21 are indicated by the numerals 1, 1, 1 . . . 1, the pels in the second pel row are indicated by the numerals 2, 2, 2 . . . 2, the pels in the third pel row are indicated by the numerals 3, 3, 3, 3, and so on, in FIGS. 2 and 3.

(b) these numerals are used to identify the pels in each pel row, but do not represent pel data, that is, each pel has pel data associated therewith, such as an indication whether it is black or white by a binary value of 1 or 0;

(c) in FIG. 2, the left-uppermost pel of the original image 21 and the left-uppermost pel of the rotated image 22 are located at the address (0, 0) to illustrate the relationship of the images 21 and 22; and (d) the scaling operations in the Y direction are not performed during the processing of the 1-10 pel rows in order to simplify the description.

The operation proceeds to a block 53 of FIG. 5, wherein the address value "5" in the X address register 8 and the address value "2" in the Y register 9, shown in FIG. 1, are supplied to the Bresenham's line generator 10, and the pels 1, 1, 1 . . . 1 of the first pel row of the original image 21 are fetched from the one row buffer 11 and are scaled down in the X direction by the X-scale unit 5. The scaled image of the first pel row is stored at addresses in the output memory 2, which are supplied by the Bresenham's line generator 10 under the control of the control device 3. It is noted that the parameters Sx=100 and $\lvert Sx \times c/a \rvert = 50$ are also supplied to the Bresenham's line generator 10 along with the value 0 in the register 17 on line 18.

Figure 6A:
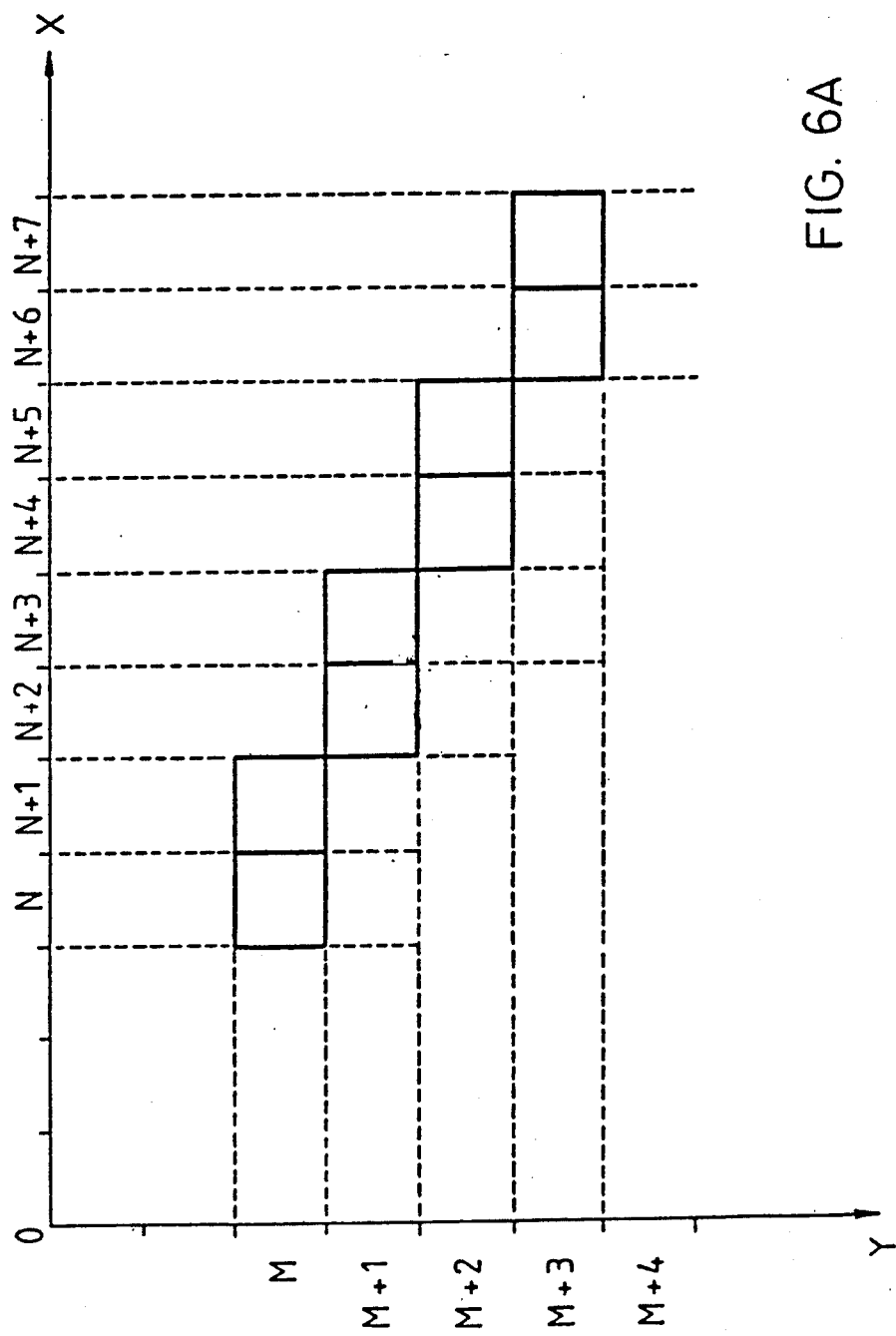
FIGS. 6A and 6B illustrate the operations of a Bresenham's line generator in generating the addresses of a pel row.
Figure 6B:
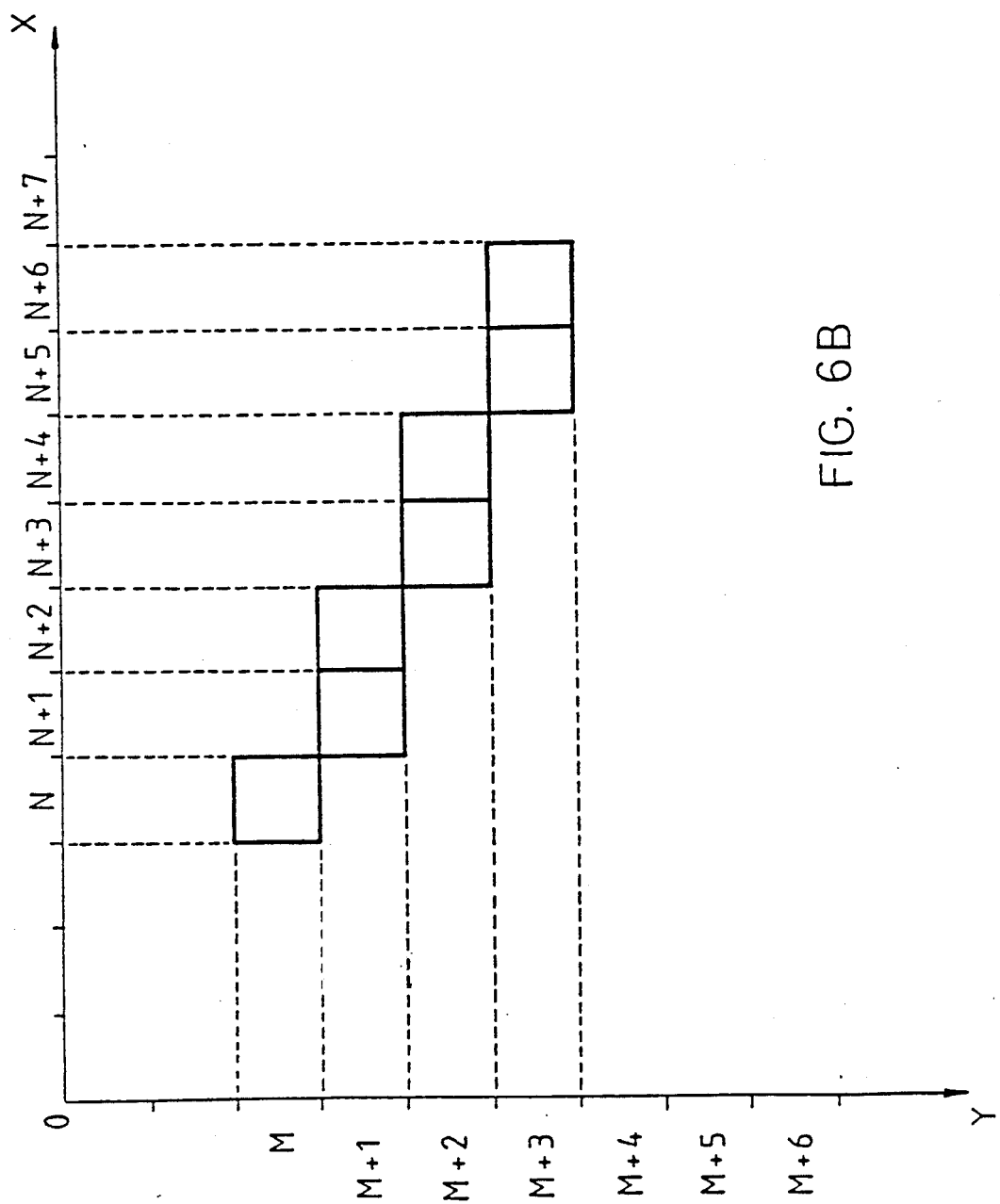

The generator 10 generates the first address sequence shown in FIG. 6A, (N, M), (N+1, M), (N+2, M+1), (N+3, M+1), (N+4, M+2), (N+5, M+2), (N+6, M+3), (N+7, M+3), or the second address sequence shown in FIG. 6B, (N, M), (N+1, M+1), (N+2, M+1), (N+3, M+2), (N+4, M+2), (N+5, M+3) . . . as the addresses of the pels of the pel row in the output memory 2 in response to the control value supplied from the register 17. If the control value in the register 17, which is supplied to the Bresenham's line generator 10, is −100, which is described hereinafter, the line generator 10 generates the first address sequence. If the control value is 0, the line generator 10 generates the second address sequence. The value in the register 17 controls the vertical alignment of address transitions of the adjacent pels in all the pel rows of the rotated image, as described hereinafter.

Since the value in the register 17 is 0 in the exemplary case, the Bresenham's line generator 10 generates the following second address sequence as the addresses of the pels in the first pel row, with the address (5, 2) in the X and Y registers 8 and 9 being used as the address of the first pel of the first pel row.

(5, 2), (6, 3), (7, 3), (8, 4), (9, 4), (10, 5), (11, 5),

Thus, a row of the scaled image is sheared, and the pels of the first pel row are then mapped or stored in the above addresses in the output memory 2 under the control of the control device 3, as illustrated in FIG. 3.

Describing now the operations of the Bresenham's line generator 10 with reference to FIG. 2, for the first pel row, the line generator 10 generates the addresses in the output memory 2 located on a line 25. The details of the operating steps of Bresenham's algorithm are described in an article by J. E. Bresenham, IBM System Journal, Vol. 4, No. 1, 1965. With the X-scale unit 5 applied with the value $Sx = 100$ and the value $|Sx \times a| = 90$, the X-scale unit will reduce the 100 pels of the first pel row to 90 pels. As shown in FIG. 2, the $Sx$ represents the number of pels of one pel row in the X direction of the original image 21, and the $|Sx \times a|$ represents the number of pels in the one pel row of the scaled image 22. Thus, the first pel row of the original image 21 is rotated and stored in the output memory 2, as shown by the numerals 1, 1, 1 ... 1 in the FIGS. 2 and 3.

Turning to the relationship between the register 17 and the Bresenham's line generator 10, the latter includes three registers 10A, 10B and 10C which correspond to the three registers 15, 16 and 17 in the V-shear unit 7, or the registers 12, 13 and 14 in the H-shear unit 6, respectively. The values stored in the registers 10A, 10B and 10C are:

Register 10A: $2 \times |Sx \times c/a|$

Register 10B: $2 \times \{|Sx \times c/a| - Sx\}$

Register 10C: $2 \times |Sx \times c/a| - Sx$

These values correspond to the following known values of Bresenham's algorithm as shown by James D. Foley and Andries Van Dam, in Fundamentals of Interactive Computer Graphics, Addison-Wesley Publishing Co., 1982, pp. 433–436.

$2 \times |Sx \times c/a|$
$= 2 \times dy$: Constant used for increment if $d < 0$ $2 \times \}|Sx - c/a| - Sx\}$
$= 2 \times (dy - dx)$: Constant used for increment if $d > -0$ $2 \times |Sx \times c/a| - Sx$
$= 2 \times dy - dx = d$: Initial value Whether the Bresenham's line generator 10 generates the first address sequence shown in FIG. 6A or the second address sequence shown in FIG. 6B is decided by the value in the register 17. In the present invention, the value is supplied from the register 17 of the V-shear unit 7 to the register 10C of the Bresenham's line generator 10 for each pel row, so that all the pels in the rotated image 22 in the output memory 2 neighbor each other without any vacancy therebetween or without overlap of the image pels, as shown in FIG. 3.

Reference to the address increment of the pels of the rotated image 22 in the Y direction in FIG. 3, will show that address increments in the Y direction in all the pel rows are not made between columns 2 and 3, columns 4 and 5, columns 6 and 7 ... while address increments in the Y direction in all the pel rows are made between columns 3 and 4, columns 5 and 6, columns 7 and 8 ... For example, between column 5 and column 6, the Y address of the first and second pels of the first pel row, the Y address of the first and second pels of the second pel row, the Y address of the second and third pels of the third pel row ... the Y address of the fourth and fifth pels of the tenth pel row are incremented; while, between column 6 and column 7, the Y address of the second and third pels of the first pel row, the Y address of the second and third pels of the second pel row ... the Y address of the fifth and sixth pels of the tenth pel row are not incremented. The address transition between two adjacent pels in a pel row means (1) the increment of both the X and Y addresses and (2) the increment of the X address and no increment of the Y address. The address transitions of the horizontally adjacent pels in all the pel rows in the rotated image 22 are vertically aligned, so that a vacancy is not included in the rotated image 22, or an image pel of one pel row does not overlap on an image pel of another pel row.

The vertical alignment of the address transition of the horizontally adjacent pels in all the pel rows in the rotated image is performed by the control value in the register 17 in the Y-shear unit 7, which is supplied to the register 10C in the Bresenham's line generator 10 through the line 18 for each processing of a pel line. Returning to the description of the system operation, the operation proceeds from block 53 to a block 54A of FIG. 5, wherein the address value "2" in the Y register 9 is updated to $Y + 1 = 3$ by the control device 3.

The operation then proceeds to a block 54B of FIG. 5, wherein the control device 3 determines whether the output signal of the Y-scale unit 4 is the binary 1. The binary 1 represents the fetch of a new or next pel row of the original image 21 into the one row buffer 11. In the exemplary case, the answer of the block 54B is YES, due to the assumption of condition (d) described hereinbefore, and the operations proceed to a block 55, wherein the next pel row or second pel row represented by the pels 2, 2, 2 ... 2 is stored in the one row buffer 11 under the control of the control device 3.

The operation then proceeds to a block 56 in FIG. 5, but before continuing with the description of the operations of the exemplary case, the basic operations of the blocks 56–61 will be described.

The blocks 56, 57 and 58 illustrate the operations performed by the control device 3 with references to the values in the registers 12, 13 and 14 in the H-shear unit 6. The H-shear unit 6 may be incorporated into the Bresenham's line generator 10. The blocks 56, 57 and 58 determine whether horizontal shear of the leftmost or first pel of a pel row is required, or not. The blocks 59, 60 and 61 show the operations performed by the control device 3 with reference to the values in the registers 15, 16 and 17 in the V-shear unit 7. The V-shear unit 7 may also be incorporated in the Bresenham's line generator. The blocks 59, 60 and 61 determine whether vertical shear of the horizontally sheared first pel of a pel row is required, or not.

Briefly describing the horizontal shear and vertical shear operations with reference to the left-lowermost pel 27 of the original image 21 in FIG. 2, the pel 27 is vertically moved to the position of pel 28 by the Y-scale unit 4, as described hereinbefore. Next, the pel 27 is horizontally moved from the position of pel 28 to the position of pel 29, and from the position of the pel 29 it is vertically moved to the position of pel 30. The horizontal movement results from the horizontal shear operation, and the vertical movement results from the vertical shear operation. The pel 30 is the left-lowermost pel of the rotated image 22. The first pel 27 is rotatably moved to the position of pel 30 by the combination of the scaling operation represented by the third matrix of equation (6), the horizontal shear operation represented by the second matrix of equation (6), and the vertical shear operation represented by the first matrix of equation (6). It is noted that the pels horizontally and vertically sheared are only the leftmost or first pels 2, 3, 4, 5 ... 10 ... of the pel rows of the original image 21; in other words, the address in the output memory 2 of the first pel of each pel row is decided by both the horizontal and vertical shear operations in addition to the Y scale operations, and the addresses in the output memory 2 of the remaining pels following the first pel of each pel row are simply decided by the Bresenham's line generator 10.

The value or shift distance of the horizontal shear operation is determined by the value ab/D in the second matrix of the equation (6). The value $|ab/D| = 0.4 = 2/5$ represents that the pel is horizontally moved on a line of the inclination ratio 2/5.

The value 2/5 substantially equals 45/111. The value 45 represents the shift distance between the pels 28 and 29, and the value 111 represents the position of the pel 28, as shown in FIG. 2. Thus, the horizontal shear operation moves pel 27 from the position of the pel 28 to the position of the pel 29.

The value or distance of the vertical shear operation is determined by the value c/a in the first matrix of the equation (6). The value $c/a = 0.5 = \frac{1}{2}$ represents that the pel is vertically moved on a line of the inclination ratio $\frac{1}{2}$. The value "1" represents the vertical movement, and the value "2" represents the horizontal movement. The value $\frac{1}{2}$ substantially equals 22/45. The value "22" represents the distance between the pels 29 and 30, and the value "45" represents the distance between the pels 28 and 29, as shown in FIG. 2. Thus, the equation (6) represents rotation of pel 27 between the position of the pel 28 to the position of the pel 30.

The pels 1, 2, 3 ... 10 on the line 31 in FIG. 2 indicating the horizontal shear operation are also shown in FIG. 3. These pels are the first or leftmost pels of the pel rows. The first pels 3 and 4 are horizontally moved by one pel position from the X position of the first pels 1 and 2; the first pels 5, 6 and 7 are horizontally moved by two pel positions from the X position of the first pels 1 and 2; and the first pels 8, 9 and 10 are horizontally moved by three pel positions from the X position of the first pels 1 and 2. These horizontal movements are shown as the values of H-shear in FIG. 3.

To complete the rotation, the pels 1, 2 ... 10 on the line 31 in FIG. 2 are then vertically sheared. The values of V-shear in FIG. 3 represent the vertical movement of the pels. That is, pels 1, 2, 3 and 4 are not vertically moved since their value of V-shear is 0. The pels 5, 6, 7, 8, 9 and 10 are vertically moved by one pel position since their value of V-shear is 1. The vertically sheared pels 1, 2, 3 ... 10 are the first or leftmost pels of the pel rows of the rotated image 22 stored in the output memory 2, as shown in FIG. 3.

Returning to the description of the blocks 56, 57 and 58 in FIG. 5, if the value in the register 14 is a negative value, the operation proceeds to the block 58, wherein the value in the register 12 is added to the current value in the register 14. Consequently, the value in the register 14 is replaced by the sum, so that the value in the register 14 is updated. If the answer of the block 56 is NO, the operation proceeds to the block 57, wherein the value in the register 13 is added to the current value in the register 14. This updates the value in the register 14, and the value in the X register 8 representing the X address of the leftmost pel of the row in the output memory 2 is incremented or decremented. The increment or decrement of the X address performs the X shear operation. It is noted that in the exemplary embodiment the X address is decremented for rotation of the original image in the clockwise direction. Accordingly, in block 57, the horizontal shear is performed, and in block 58, horizontal shear is not performed.

Subsequent to the horizontal shear operation in block 57, the control device 3 determines whether the vertical shear of the horizontally sheared first pel should be made or not, through the operations in blocks 59, 60 and 61. In block 59, the control device 3 subtracts the value in the register 15 from the current value in the register 17, and replaces the current value by the resulting value so that the value in the register 17 is updated. Then, in block 60 the control device 3 determines whether the value in the register 17 is smaller than the value in the register 16. If the answer of block 60 is NO, the operation proceeds to the block 53. If the answer of block 60 is YES, the operation proceeds to the block 61, wherein the control device 3 increments or decrements the value of the Y address register 9. In the exemplary case, the decrement of the value is performed. Also, the control device 3 subtracts the value in the register 16 from, and adds the value in the register 15 to, the current value in the register 17, and then replaces the current value in the register 17 by the resultant value. Then, the operation proceeds to the block 53.

Now, returning to the description of the block 56, in order to start the processing of the second pel row, which is now stored in the one row buffer 11, the values in the various registers at this stage are shown in the Table 1:

Register 12: 80
Register 13: −120
Register 14: −20
Register 15: 100
Register 16: −100
Register 17: 0

And, the values in the X and Y registers 8 and 9 which represent the address of the first pel of the pel row are "5" and "3", respectively. It is noted that the values in the registers 14 and 17 and the X and Y registers 8 and 9 are updated, while the values in the registers 12, 13, 15 and 16 are not changed.

The answer of the block 56 is YES, since the value in the register 14 is −20. The current value −20 in the register 14 is then updated to the new value −20+80=60 in the block 58. The operation proceeds to the block 53, wherein the address value "5" in the X register 8 and the address value "3" in the Y register 9 are supplied to the Bresenham's line generator 10. The value in the register 17 supplied to the generator 10 is 0, so that the generator 10 generates the following second address sequence as the addresses of all the pels in the second pel row in the output memory 2, wherein the address (5, 3) in the X and Y registers 8 and 9 represents the address of the first pel of the second pel row.

(5, 3), (6, 4), (7, 4), (8, 5), (9, 5), (10, 6), (11, 6), (12, 7), (13, 7),

And, another row of the scaled image or all the pels of the second pel row are then mapped or stored in the above addresses in the output memory 2.

Next, the control device 3 increments the value "3" in the Y register 9 to the value "4" in the block 54A. The answer of the next block 54B is YES due to the assumption of condition (d) described hereinbefore. The control device 3 stores the third pel row in the one row buffer 11 in the block 55.

The operation loops back to the block 56. The values in the registers 14 and 17 and the X and Y registers 8 and 9 at this step are as follows:
Register 14: 60
Register 17: 0
X register 8: 5
Y register 9: 4

The answer of the block 56 is NO. In block 57, the value −120 in the register 13 is added to the current value 60 in the register 14. The new value in the register 14 is −60, and the value "5" in the X register 8 is decremented to the new value "4". Then, in block 59, the value 100 in the register 15 is subtracted from the value 0 in the register 17, so that the new value in the register 17 is −100. In the next block 60, the value −100 in the register 17 is compared with the value −100 in the register 16. The answer of the block 60 is NO, and the operation proceeds to the block 53. The values at this step are:
Register 17: −100
X register 8: 4
Y register 9: 4

In block 53, the Bresenham's line generator 10 generates, in response to the above values, the following first address sequence of the third pel row in the output memory 2:

(4, 4), (5, 4), (6, 5), (7, 5), (8, 6), (9, 6), (10, 7), (11, 7),

And, another row of the scaled image, or all the pels of the third pel row, is stored in the above addresses in the output memory 2, as shown in FIG. 3.

In the next block 54A, the control device 3 increments the value "4" in the Y register 9 to the value "5". The answer of the next block 54B is YES due to the assumption of condition (d) described hereinbefore. In adjacent block 55, the fourth pel row of the original image 21 is stored in the one row buffer 11. Then, the operation loops back to the block 56.

The values at this stage of the operation are as follows:
X register 8: 4
Y register 9: 5
Register 14: −60
Register 17: −100

The answer of the block 56 is YES. In the next block 58, the value −60 in the register 14 is changed to the new value 20. In the next block 53, the Bresenham's line generator 10 generates the following first address sequence of the fourth pel row in the output memory 2, in response to the above values.

(4, 5), (5, 5), (6, 6), (7, 6), (8, 7), (9, 7), (10, 8), (11, 8),

And, another row of the scaled image of the fourth pel row is stored in the above addresses in the output memory 2, as shown in FIG. 3.

In the next block 54A, the control device 3 increments the value 5 in the Y register 9 to the new value 6. The answer of the next block 54B is YES due to the assumption (d). In the next block 55, the fifth pel row of the original image 21 is stored in the one row buffer 11. Then, the operation loops back to the block 56.

The values at this step are as follows.
X register 8: 4
Y register 9: 6
Register 14: 20
Register 17: −100

The answer of the block 56 is NO. In the next block 57, the value −120 in the register 13 is added to the current value 20 in the register 14 and the new value −100 is stored in the register 14, and the current value "4" in the X register 8 is decremented to the new value "3". In the next block 59, the value 100 in the register 15 is subtracted from the current value −100 in the register 17, and the resultant value −200 is stored in the register 17. In the next block 60, the updated value −200 in the register 17 is compared with the value −100 in the register 16. The answer of the block 60 is YES. And, in the block 61, the current value "6" in the Y register 9 is decremented to the new value "5" Also the value −100 in the register 16 is subtracted from, and the value 100 in the register 15 is added to, the value −200 in the register 17, and the resultant value 0 is stored in the register 17.

The values at this step are as follows.
X register: 3
Y register: 5
Register 17: 0

The operation proceeds to the block 53, wherein the Bresenham's line generator 10 generates the following second address sequence of the fifth pel row in the output memory 2, in response to the above values.

(3, 5), (4, 6), (5, 6), (6, 7), (7, 7), (8, 8), (9, 8), (10, 9), (11, 9),

Then, the scaled image of the fifth pel row is stored in the above addresses in the output memory, as shown in the FIG. 3.

The above operations are repeatedly performed under the control of the control device 3 to complete the storing of the rotated image 22 in the output memory 2. When the last pel row of the scaled image has been stored in the output memory 2, this status is detected by the control device 3 and the operation ceases.

As will be apparent from the foregoing description, the invention uses five Bresenham's line generators, i.e. two generators for the X-scale unit 4 and the Y-scale unit 5, two generators for the H-shear unit 6 and the V-shear unit 7, and one generator for the line generator 10. Only the first pel of each pel row in the X and Y scaled image 26 is sheared in both the X and Y directions. The remaining pels in each row are generated by the line generator 10.

While the present invention has been described using the example of rotating the original image by the angle 26° in the clockwise direction, it will be appreciated that the invention is applicable with a full range of rotational angles. Also, although the present invention has been described using a hardware configuration, such as shown in FIG. 1, the invention could be implemented by a combination of hardware and software as will be within the purview of those skill in the art. More particularly, the X scale operations and the line generating operations may be performed by the X scale unit 4 and the Bresenham's line generator 10, while the Y scale operations and both the horizontal and vertical shear operations could be implemented by software.

Other types of line generators might be used, which respond to the address of the first pel of the pel row and the value representing the vertical shear to generate the addresses of all the pels in the pel row.

It will therefore be seen that in the resultant rotated image 22 shown in FIG. 3, all the pels neighbor each other without any vacancy therebetween or overlap of the image pels. This result is the same as that achieved with the rotated image generated by the technique described in the aforementioned IBM Technical Disclosure Bulletin, Vol. 28, No. 10, March 1986, pp. 4330-4331. In that article, all the pels of the original image are sheared, so that the time period for generating the rotated image is much longer than that in the present invention. In other words, the present invention generates an ideal rotated image in a considerably shorter processing time period.

What is claimed is:

1. An image processing apparatus for rotating an original image composed of picture elements arranged in rows and columns through a selected rotation angle and generating a rotated version of said image in an output image memory, comprising:
   scaling means, responsive to scaling values determined by said selected rotation angle, for generating each row of a scaled version of said original image;
   shearing means, responsive to values of horizontal and vertical shears determined by said selected rotation angle, for performing horizontal shear and vertical shear operations on the first picture elements of each row of said scaled version and generating respective addresses in said output image memory into which the first picture elements after shearing are to be stored;
   line generator means, responsive to said respective addresses of said first picture elements and said value of vertical shear, for generating addresses in said output image memory into which all the remaining picture elements of said rows of said scaled version are to be stored; and
   control means for controlling said scaling means, shearing means, and line generator means and storing all of the first picture elements and all the remaining picture elements of said rows in said generated addresses of said output image memory to produce a rotated version of said original image.

2. An image processing apparatus according to claim 1, wherein said scaling means comprises Y-scale means for scaling said original image in the column direction and X-scale means for scaling said original image in the row direction.

3. An image processing apparatus according to claim 1, wherein said shearing means comprises H-shear means for performing the horizontal shear operations of the first picture elements of said rows and V-shear means for performing the vertical shear operations of said horizontally sheared first picture elements.

4. An image processing apparatus according to claim 3, wherein said V-shear means generates a control value and said line generator means, responsive to said value of vertical shear, the addresses of the first picture elements of each row of said scaled image version and said control value generated by said V-shear means, generates the addresses of all the picture elements of each row of said scaled image version in said output image memory, and maintains address transitions of horizontally adjacent picture elements in all the rows in said rotated image version in said output image memory vertically aligned.

5. An image processing apparatus according to claim 1 wherein said control means comprises a microcomputer.

6. An image processing apparatus according to claim 1 wherein said line generator means comprises a Bresenham's line generator.

7. An image processing method for rotating an original image comprised of picture elements arranged in rows and columns through a selected rotation angle and generating a rotated version of said image in an output image memory, comprising the steps of:
   generating each row of a scaled version of said original image in response to scaling values determined by a selected rotation angle;
   performing horizontal shear and vertical shear operations on the first picture elements of each row of said scaled version in response to values of horizontal and vertical shears determined by said selected rotation angle, and generating respective addresses in said output image memory into which the first picture elements after shearing are to be stored;
   generating, in response to said respective addresses of said first picture elements and said value of vertical shear, addresses in said output image memory into which all the remaining picture elements of said rows of said scaled version are to be stored; and
   storing all of the first picture elements and the remaining picture elements of said rows in said generated addresses of said output image memory to produce a rotated version of said original image.

8. An image processing method according to claim 7 wherein the step of generating said scaled version comprises scaling said original image in the column direction and in the row direction.

9. An image processing method according to claim 7 wherein the step of performing horizontal and vertical shearing operations comprises performing the horizontal shear operations on the first picture elements of said rows and then performing the vertical shearing operations on said horizontally sheared first picture elements.

10. An image processing method according to claim 9 further comprising the step of generating a vertical shear control value and wherein the step of generating addresses in said output image memory for the remaining picture elements comprises generating, in response to said value of vertical shear, the addresses of the first picture elements of said scaled image version and said vertical shear control value, the addresses of all the picture elements of each row of said scaled image version in said output image memory and maintaining address transitions of horizontally adjacent picture elements in all the rows in said rotated image version in said output image memory vertically aligned.

11. A method according to claim 7, wherein said step of generating addresses in said output image memory into which all the remaining picture elements of said rows of said scaled version are to be stored, is performed by a line generator.

12. A method according to claim 11, wherein said line generator is a Bresenham's line generator.

* * * * *